United States Patent
Todasco

(10) Patent No.: US 10,945,052 B2
(45) Date of Patent: *Mar. 9, 2021

(54) GATHERING UNIQUE INFORMATION FROM DISPERSED USERS

(71) Applicant: PAYPAL, INC., San Jose, CA (US)

(72) Inventor: Michael Charles Todasco, Santa Clara, CA (US)

(73) Assignee: PayPal, Inc., San Jose, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 16/162,308

(22) Filed: Oct. 16, 2018

(65) Prior Publication Data

US 2019/0208293 A1 Jul. 4, 2019

Related U.S. Application Data

(63) Continuation of application No. 14/273,398, filed on May 8, 2014, now Pat. No. 10,104,452.

(51) Int. Cl.
*H04Q 9/00* (2006.01)

(52) U.S. Cl.
CPC .......... *H04Q 9/00* (2013.01); *H04Q 2209/25* (2013.01); *H04Q 2209/40* (2013.01)

(58) Field of Classification Search
CPC ... H04Q 9/00; H04Q 2209/25; H04Q 2209/40
See application file for complete search history.

(56) References Cited

U.S. PATENT DOCUMENTS

| | | | |
|---|---|---|---|
| 5,371,854 A | 12/1994 | Kramer | |
| 7,477,903 B2 | 1/2009 | Wilcock et al. | |
| 8,103,304 B1 | 1/2012 | Miller et al. | |
| 10,295,556 B1* | 5/2019 | Paczkowski | A61B 5/0823 |
| 2008/0012701 A1 | 1/2008 | Kass et al. | |
| 2010/0241350 A1 | 9/2010 | Cioffi et al. | |
| 2011/0137437 A1* | 6/2011 | Jonsson | G01C 21/20 700/94 |
| 2013/0238325 A1* | 9/2013 | Kristjansson | G10L 21/0208 704/226 |
| 2014/0132411 A1 | 5/2014 | Buchheim et al. | |
| 2014/0267799 A1* | 9/2014 | Sadasivam | H04N 5/23245 348/207.99 |
| 2014/0327779 A1* | 11/2014 | Eronen | H04N 7/181 348/159 |
| 2015/0249904 A1* | 9/2015 | Weiss | H04W 4/023 455/456.1 |
| 2016/0165620 A1* | 6/2016 | Dagen | G08B 13/19656 709/219 |
| 2017/0103420 A1 | 4/2017 | Ramasarma | |

* cited by examiner

*Primary Examiner* — Amine Benlagsir
(74) *Attorney, Agent, or Firm* — Haynes & Boone, LLP

(57) ABSTRACT

Methods and systems for providing information to a user are described. Multiple mobile devices can individually collect data and feed the data to beacons in a location. The information can include sound data, light data, motion data, health and wellness related data, humidity data, and/or temperature data. The beacons receive this data from multiple users and transmit it to a service provider. The service provider collects the data from the beacons and provides the data to one or more users.

20 Claims, 3 Drawing Sheets

GATHERING UNIQUE INFORMATION FROM DISPERSED USERS

CROSS REFERENCE TO RELATED APPLICATIONS

This application claims priority to U.S. patent application Ser. No. 14/273,398, filed May 8, 2014, which is incorporated by reference herein in its entirety.

BACKGROUND

Field of the Invention

The present invention generally relates to collecting information from several different users and providing the information to one or more users.

Related Art

The use of mobile devices has increased dramatically so that almost everyone carries a mobile device everywhere. Mobile devices typically have several sensors for gathering information. For example, mobile devices may include motion sensors, optical sensors, temperature sensors, wellness or health related sensors, etc. It would be beneficial to organize and use the data collected from these sensors.

Figure 1:
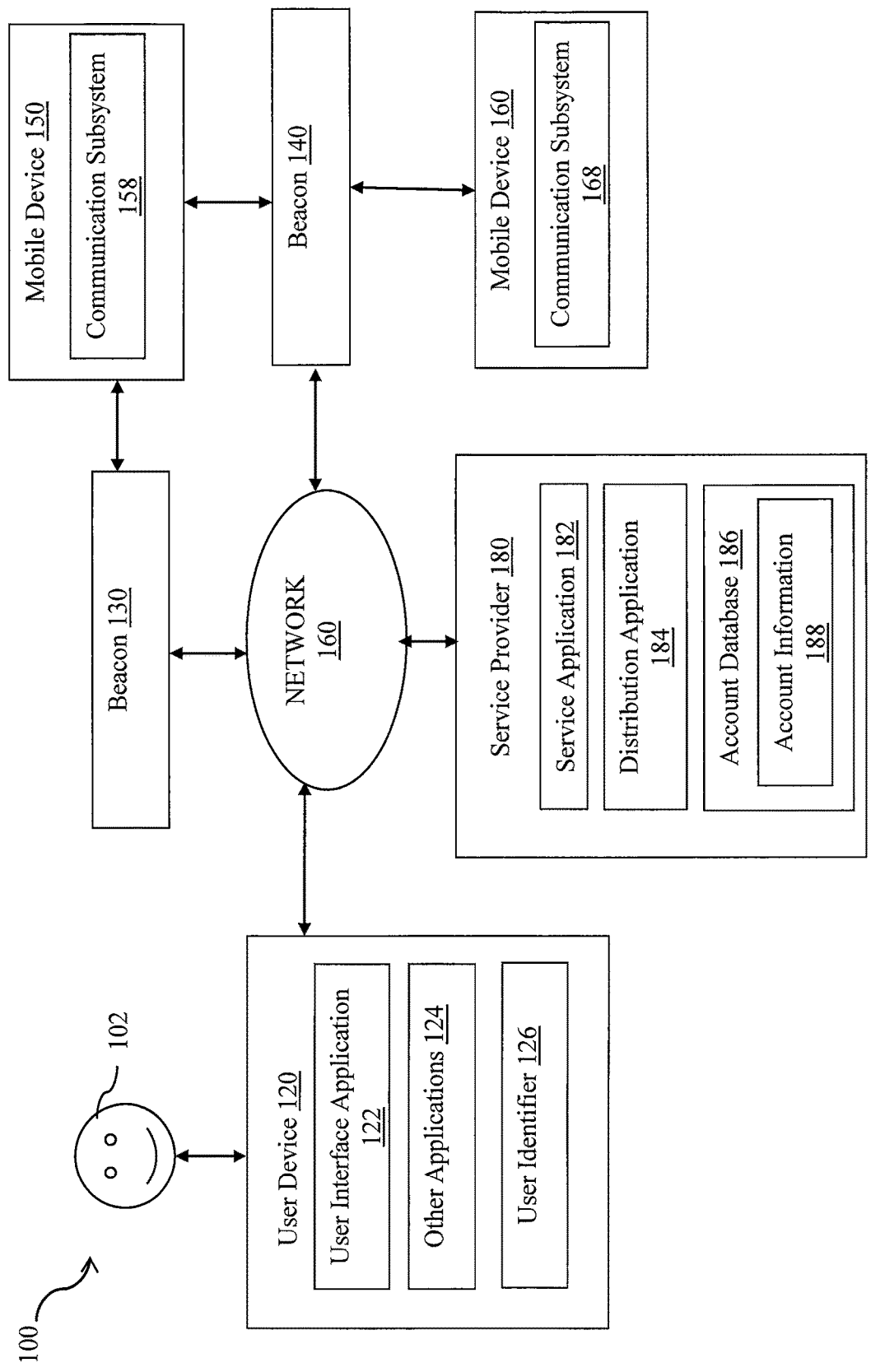
FIG. 1 is a block diagram illustrating a system for providing information to a user according to an embodiment of the present disclosure.

Embodiments of the present disclosure and their advantages are best understood by referring to the detailed description that follows. It should be appreciated that like reference numerals are used to identify like elements illustrated in one or more of the figures, wherein showings therein are for purposes of illustrating embodiments of the present disclosure and not for purposes of limiting the same.

DETAILED DESCRIPTION

The present disclosure describes systems and methods of collecting, organizing, and providing data to users. Users with mobile devices can individually collect data. The data can be provided to a service provider through, for example, a network such as a WiFi or cellular network. In one example, a microphone on a mobile device can capture the volume of ambient noise at an event, such as a concert. This data can be transmitted to beacons in different locations at the concert venue to report noise levels in real time. With accurate location data from the beacons, a sound map displaying sound intensity at the concert can be generated. In various embodiments, clarity of the sound can also be measured by the microphone. A user can see not only the intensity of sound, but also how closely the sound pattern matches the source that is supposed to be heard.

Multiple users can provide information to the beacons. The information can include, for example, sound data, light data, motion data, health related data, humidity data, and/or temperature data. The beacons receive this data from multiple users and transmit it to a service provider. The service provider collects the data from the beacons and provides the data to one or more users. In some embodiments, the service provider aggregates the data. In various embodiments, the aggregated data is presented in a summarized format, such as a map, chart, diagram, or graph. In other embodiments, the information can be presented to one or more users in a series of alerts or in any suitable way so that outliers in the data can be observed.

The present disclosure leverages networks used for communication as a path to gain access to a large number of people. People can collect various kinds of information from their unique environment. This permits the efficient capture of information at various locations and at different times. Otherwise, it would be an overwhelming effort for one entity, group of people, or large organization to collect such a large amount of data.

FIG. 1 shows one embodiment of a block diagram of a network-based system 100 adapted to provide information to a user, such as user 102. As shown, system 100 may comprise or implement a plurality of servers and/or software components that operate to perform various methodologies in accordance with the described embodiments. Exemplary servers may include, for example, stand-alone and enterprise-class servers operating a server OS such as a MICROSOFT® OS, a UNIX® OS, a LINUX® OS, or other suitable server-based OS. It can be appreciated that the servers illustrated in FIG. 1 may be deployed in other ways and that the operations performed and/or the services provided by such servers may be combined or separated for a given implementation and may be performed by a greater number or fewer number of servers. One or more servers may be operated and/or maintained by the same or different entities.

As shown in FIG. 1, the system 100 includes a user device 120 (e.g., a smartphone), beacons 130 and 140 (e.g., a radio frequency beacon or Bluetooth Low Energy (BLE) beacon), mobile devices 150 and 160 (e.g., a smartphone), and at least one service provider server or device 180 (e.g., network server device). The user device 120, beacons 130 and 140, and service provider server 180 are in communication over the network 160. The network 160, in one embodiment, may be implemented as a single network or a combination of multiple networks. For example, in various embodiments, the network 160 may include the Internet and/or one or more intranets, landline networks, wireless networks, and/or other appropriate types of communication networks. In another example, the network 160 may comprise a wireless telecommunications network (e.g., cellular phone network) adapted to communicate with other communication networks, such as the Internet. The mobile devices 150 and 160 can communicate to the beacons 130 and/or 140 through Bluetooth low energy or other radio frequencies.

The user device 120, in one embodiment, may be utilized by the user 102 to interact with the service provider server 180 over the network 160. For example, user 102 may conduct information transactions with the service provider server 180 via the user device 120.

The mobile devices 150 and 160 are configured to perform one or more tasks when mobile devices 150 and 150 are located in proximity to the beacons 130 or 140. The task to be performed can include, for example, launching an application program, setting certain files to non-accessible mode, initiating a phone call, sounding an alarm, storing a message, displaying a message, etc.

The user device 120, in various embodiments, may be implemented using any appropriate combination of hardware and/or software configured for wired and/or wireless communication over the network 160. The user device 120, in one embodiment, may be utilized by the user 102 to interact with the service provider server 180 over the network 160. For example, the user 102 may conduct information transactions with the service provider server 180 via the user device 120. In various implementations, the user device 120 and mobile devices 150, 160 may include a wireless telephone (e.g., cellular or mobile phone), a tablet, a wearable computing device, a personal computer, a notebook computer, and/or various other generally known types of wired and/or wireless computing devices.

The user device 120, in one embodiment, includes a user interface application 122, which may be utilized by the user 102 to conduct information transactions with the service provider server 180 over the network 160.

In one implementation, the user interface application 122 comprises a software program, such as a graphical user interface (GUI), executable by a processor that is configured to interface and communicate with the service provider server 180 via the network 160. In another implementation, the user interface application 122 comprises a browser module that provides a network interface to browse information available over the network 160. For example, the user interface application 122 may be implemented, in part, as a web browser to view information available over the network 160.

The user device 120, in various embodiments, may include other applications 124 as may be desired in one or more embodiments of the present disclosure to provide additional features available to user 102. In one example, such other applications 124 may include security applications for implementing client-side security features, calendar application, contacts application, location-based services application, programmatic client applications for interfacing with appropriate application programming interfaces (APIs) over the network 160, and/or various other types of generally known programs and/or software applications. In still other examples, the other applications 124 may interface with the user interface application 122 for improved efficiency and convenience.

In various implementations, a user profile may be created using data and information obtained from cell phone activity over the network 160. Cell phone activity transactions may be used by the service provider server 180 to create at least one user profile for the user 102 based on activity from the user device 120 (e.g., cell phone). The user profile may be updated with each information transaction achieved through use of the user device 120.

The user device 120, in one embodiment, may include at least one user identifier 126, which may be implemented, for example, as operating system registry entries, cookies associated with the user interface application 122, identifiers associated with hardware of the user device 120, or various other appropriate identifiers. The user identifier 126 may include one or more attributes related to the user 102, such as personal information related to the user 102 (e.g., one or more user names, passwords, photograph images; biometric IDs, addresses, phone numbers, etc.). In various implementations, the user identifier 126 may be passed with a user login request to the service provider server 180 via the network 160, and the user identifier 126 may be used by the service provider server 180 to associate the user 102 with a particular user account maintained by the service provider server 180.

In some embodiments, the mobile devices 150 and 160 each include a communication subsystem 158 and 168, which can include radio frequency receivers and transmitters and/or optical (e.g., infrared) receivers and transmitters. The specific design and implementation of the communication subsystems 158 and 168 can depend on the communication network over which the mobile devices 150 and 160 are intended to operate. For example, the mobile devices 150 and 160 can each include communication subsystems designed to operate over a Global System for Mobile Communication (GSM) network, a General Packet Radio Service (GPRS) network, an Enhanced Data Rates for Global Evolution (EDGE) network, a Wi-Fi or WiMax network, and a Bluetooth™ network.

Mobile devices 150 and 160 may each include one or more of a motion sensor, an image sensor (e.g., camera), a voice sensor (e.g., microphone), an optical sensor, and any other kind of device suitable to collect information from a user and his or her environment. Motion sensors such as motion detectors, accelerometers and/or gyroscopes may monitor speed, acceleration, position, rotation, and other characteristics of body and appendage motion. The motion sensor captures movement of a user and his or her surroundings. An image sensor captures images of a user and other objects. A voice sensor captures voice or sounds. An optical sensor captures and characterizes light. Information captured by the sensors may be collected and transmitted to the service provider server 180 via beacons 130 and 140.

In some embodiments, the mobile devices 150 and 160 are wearable computing devices, such as a smart watches or smart goggles. The wearable computing device may act as a monitoring device that includes at least one or more types or categories of sensors adapted to be worn on a user's body. The sensor or sensors, which may include multiple electrodes or other subordinate sensing devices of equivalent type, may be drawn from the categories of contextual and physiological sensors. The physiological sensors may be selected from the group consisting of: respiration sensors, temperature sensors, heat flux sensors, body conductance sensors, body resistance sensors, body potential sensors, brain activity sensors, blood pressure sensors, body impedance sensors, body motion sensors, oxygen consumption sensors, body chemistry sensors, blood chemistry sensors, interstitial fluid sensors, body position sensors, body pressure sensors, light absorption sensors, body sound sensors, piezoelectric sensors, electrochemical sensors, strain gauges, heart rate sensors, and optical sensors. Sensors are incorporated to generate data indicative of detected parameters of a user. Monitoring of physiological information is useful in hospitals, doctor's offices, gyms, and retirement homes.

The mobile devices 150 and 160, in some embodiments, are adapted to automatically collect and send information to the beacons 130 and 140 without user intervention and on a continuous basis. In other embodiments, the users associated with the mobile devices 150 and 160 opt-into collecting information and transmitting it to the beacons 130 and 140. Users associated with the mobile devices 150 and 160 may have an account with the service provider. These users, however, are not required to register with the service provider to collect and transmit information to the beacons 130 and 140.

Beacons 130 and 140 may be set up to transmit requests for sensed information and receive sensed information back from mobile devices 150 and 160. As used herein, "sensed information" refers to any type of information that is detected by a sensor. As defined herein, a "beacon" is a short range communication device having a known or fixed location that provides a signal that can be detected by mobile devices within a certain proximity of the beacon. An example of a beacon is a radio frequency (RF) beacon (e.g., Bluetooth™ low energy (BLE) beacon), infrared beacon or a radio frequency identifier (RFID) tag. For example, a BLE beacon can broadcast an RF signal that includes its position coordinates (e.g., latitude, longitude), which can be detected by a mobile device. In some implementations, the beacon can also advertise location based services provided by a beacon network. A beacon network encompasses a plurality of beacons in a geographic region. Beacon networks can be located in any geographic region including businesses (e.g., shopping malls, retail stores, restaurants, etc.), landmarks (e.g., museums, airports, parks, entertainment venues, etc.), homes and any other environments where location based services are desired.

Beacons 130 and 140 are typically maintained by one or more service providers. When mobile device 150 or 160 comes in range of beacon 130 or beacon 140, a mobile application on the mobile device 150 or 160 run by a service provider can wake up and connect to the beacon 130 or 140. Mobile devices 150 and 160 can then receive messages from beacons 130 and/or 140 and communicate with beacons 130 and/or 140. In some implementations, beacons 130 and 140 are each a BLE beacon.

Beacons 130 and 140 can each output a wireless signal that can be detected by mobile devices 150 and 160 when mobile devices 150 and 160 are within a certain proximity of the beacons 130 and/or 140. Beacons 130 and 140 may each be a device that periodically or continuously transmits a signal, such as a short-distance wireless (e.g., BLE), medium distance wireless (e.g., Wi-Fi), and/or other electro, magnetic, and/or electro-magnetic transmissions. Power on beacons 130 and 140 can be adjusted to communicate only within a desired range, which may depend on intended message ranges. Mobile devices 150 and 160 are configured to detect the transmitted signals from beacons 130 or 140, such that when mobile devices 150 and 160 are located within the transmission range of either beacon 130 or 140, the signal may be detected.

The service provider server 180, in one embodiment, may be maintained by a transaction processing entity, which may provide processing for information transactions for user 102. As such, the service provider server 180 includes a service application 182, which may be adapted to interact with the user device 120 over the network 160. In one example, the service provider server 180 may be provided by PayPal®, Inc. or eBay® of San Jose, Calif., USA.

The service provider server 180, in one embodiment, may be configured to maintain one or more user accounts in an account database 186 each of which may include account information 188 associated with one or more individual users (e.g., user 102). For example, account information 188 may include private information of user 102, such as one or more email addresses, passwords, and/or home addresses. In various aspects, the methods and systems described herein may be modified to accommodate users that may or may not be associated with at least one existing user account.

In one implementation, the user 102 may have identity attributes stored with the service provider server 180, and user 102 may have credentials to authenticate or verify identity with the service provider server 180. User attributes may include personal information. In various aspects, the user attributes may be passed to the service provider server 180 as part of a login, search, and/or selection, and the user attributes may be utilized by the service provider server 180 to associate user 102 with one or more particular user accounts maintained by the service provider server 180.

In various embodiments, service provider server 180 includes a collection application 184. The collection application 184 determines what kind of information should be gathered, directs beacons 130 and 140 to request that information, receives that information from beacons 130 and 140, and receives location information from beacons 130 and 140. In some embodiments, the collection information 184 organizes and/or processes all the received information and provides it to the user 102 in a useful format.

Figure 2:
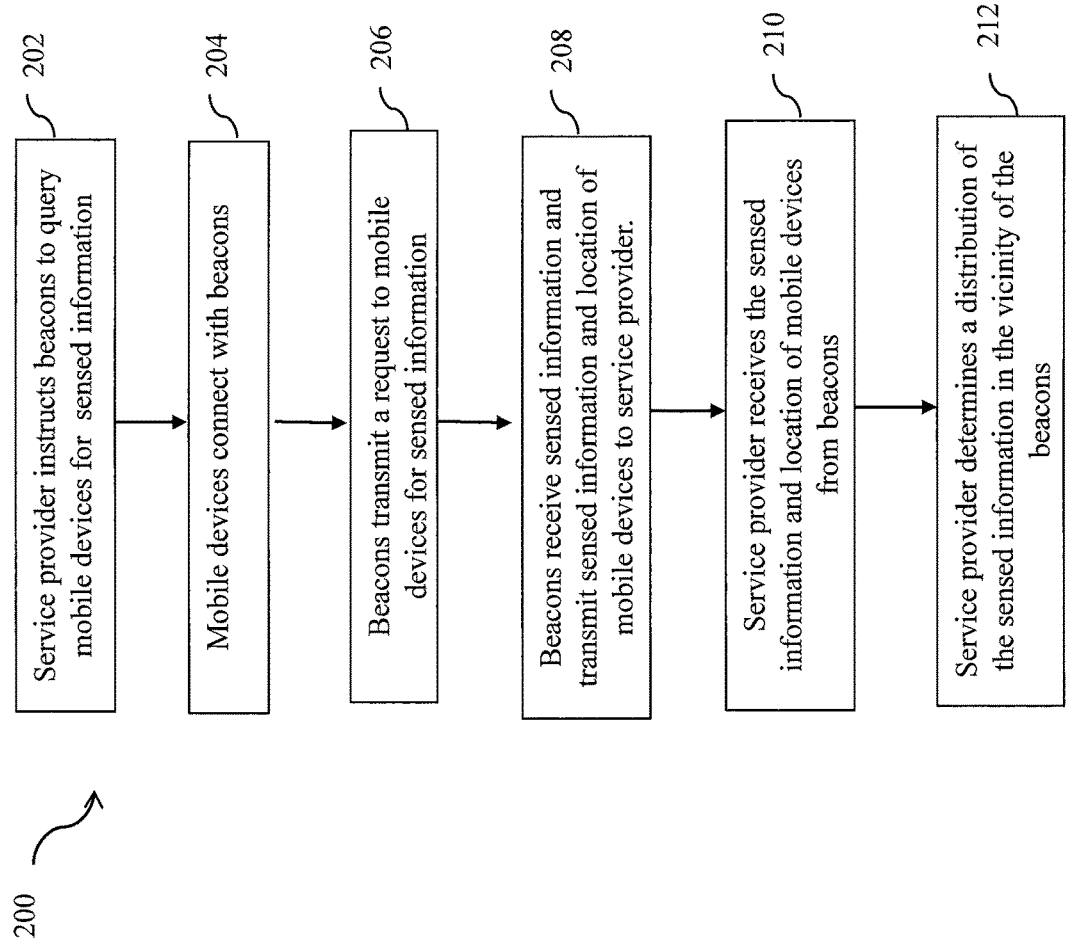
FIG. 2 is a flowchart showing a method for providing information to a user according to an embodiment of the present disclosure.

Referring now to FIG. 2, a flowchart 200 of a method for providing information to a user, e.g., user 102, is illustrated according to an embodiment of the present disclosure. In various embodiments, the user 102 registers with a service provider, which runs a mobile application. Registration may include signing up for the service and agreeing to any terms required by the service provider, such as through a user device. In one embodiment, the user device is a mobile computing device, such as a smart phone, a PC, or a computing tablet. In other embodiments, registration may be done completely through the user device, partially through the user device, or without using the user device, such as through a phone call or in-person visit to a representative of the payment service provider.

The user may be requested to provider specific information for registration, such as, but not limited to, a name, address, phone number, email address, picture, a user name for the account, and a password or PIN for the account. The type of information may depend on whether the user already has an account with the service provider. Requested information may be entered through the user device or other means, including voice or manual key entry. Once all the requested information is received and confirmed, the service provider may create an account for the user.

At step 202, the service provider server 180 instructs the beacons 130 and 140 to query mobile devices in their vicinity regarding sensed information. In some embodiments, the user 102 transmits a request to the service provider server 180 indicating what information to collect. The sensed information may include contextual information, such as information related to sound, light, temperature, humidity, and/or motion in the environment. The sensed information may also include physiological information of a user, such as information related to heart rate, blood pressure, breathing rate, and/or number of steps taken by a user.

The sensors on the mobile devices 150 and 160 can collect various kinds of information. In some embodiments, the sensors collect contextual information or information from the environment. For example, the sensors may include accelerometers, magnetometers, gyro sensors, ambient light sensors, proximity sensors, temperature sensors, humidity sensors, gas sensors, air pressure sensors, etc., In other embodiments, the sensors collect physiological data from people, e.g., users associated with mobile devices 150 and 160. For example, the sensors may include heart rate sensors, temperature sensors, heart rate monitors, blood pressure sensors, etc.

In an exemplary embodiment, the sensed information is collected using a wearable computing device, such as a smartwatch. Using a smartwatch enhances the user experience since users do not need to physically hold on to a device, and they have more freedom of movement.

When the mobile devices 150 and 160 enter the vicinity of beacon 130 or 140, at step 204, the mobile devices 150 and 160 each make a connection with beacon 130 and/or 140. The mobile devices 150, and 160 may connect with one beacon (e.g., beacon 130 or beacon 140), or each mobile device may connect with a different beacon. For example, mobile device 150 can connect with beacon 130 and mobile device 160 can connect with beacon 140. The mobile devices 150 and 160 can also connect with both beacons 130 and 140.

The beacons 130 and 140 sense the mobile devices 150 and 160's presence by way of electronic communication with the mobile devices 150 and 160. As such, the mobile devices 150 and 160's specific location can be determined using beacons 130 and 140.

At step 206, the beacons 130 and 140 transmit a request to the mobile device 150 and/or mobile device 160 for a specific type of sensed information. The beacon requests can be transmitted from beacons 130 and 140 to one or more mobile devices using a BLE wireless communication protocol. BLE is an exemplary wireless communication protocol that can be used to transmit requests as described herein with low energy cost. The requests are not limited to use with BLE, but can be used with other low energy or non-low energy wireless communication protocols, such as Wi-Fi.

In various embodiments, the beacons 130 and 140 may themselves include sensors, such as motion sensors, image sensors, voice sensors, and optical sensors. When the beacons 130 and 140 detect that the sensed information is intense, becoming more intense, or changing at a fast rate, they may collect information at a faster rate. In other embodiments, when the beacons 130 and 140 start collecting information from a few mobile devices and note that there is rapid change in the sensed information, the beacons 130 and 140 will start querying other mobile devices in the area to confirm and understand that change. For example, in the case of sound collection, if the beacons 130 and 140 gather information from mobile devices 150 and 160 and note that sounds are becoming louder, the beacons 130 and 140 may send signals out at 10 second intervals instead of at 20 second intervals to other mobile devices in the area. The range of beacons can also be adjusted based on the information being collected. For example, if a beacon is not receiving much, if any, information from local devices, the power for that beacon may be increased to bring more devices into beacon range. In another example, if the beacon is receiving too much information or a lot of information to process in short amounts of time (e.g., data being received at a high frequency from many devices), the power for that beacon may be reduced to decrease the number of devices within the beacon range.

The mobile devices 150 and 160 can receive requests and transmit signals containing the requested sensed information to the beacon 130 and/or beacon 140. At step 208, the beacons 130 and 140 receive these signals and transmit the sensed information contained in these signals, along with mobile device location information to the service provider server 180. The signals may also include information about beacon location and/or a location of a noise source or other source being detected by the mobile devices. This can help the service provider more accurately process the signals and create a more accurate map, especially if the map is directed to one or more specific sources (e.g., a concert) as opposed to a more general or random set of sources (e.g., traffic noises near a house). Other information in the signals may include time/day information, so that the service provider may map out sounds at different times of the day, month, or year. Yet other information may include the type of user device, as some devices may be more sensitive than other devices.

At step 210, the service provider server 180 receives the sensed information and the mobile device location from the beacons 130 and 140. In various embodiments, the user 102 can access this information and/or the service provider server 180 provides this information to user device 120.

At step 212, the service provider server 180 determines a distribution of the sensed information in the vicinity of the beacons 130 and 140, and provides this information to the user 102. The service provider can take this data and present it in the form of a map, chart, graph, diagram, or other visual representation of the information. The visual representation may include different colors to represent different intensities or characteristics of the information. This visual representation may then be made available to user 102.

Examples

Particular examples will now be described. A construction company wants to collect sound data at a construction site. Several beacons are placed at various locations on the site, and the beacons transmit signals requesting decibel levels at the site. As mobile phones come within the vicinity of the beacons, the noise levels detected by microphones on the mobile phones are transmitted to the beacons. These noise levels and the location of the mobile phones are sent to a service provider. The service provider takes the noise level and location information and generates a sound map. The sound map may take the form of a map of sound intensity at various coordinates. The sound map may be displayed, for example, on an x-y grid using various colors to represent sound intensity at different positions. The sound map allows a user to easily identify the regions on the map where the intensity of the noise is the greatest or the least.

The police want to pinpoint the exact location of a source of gunfire in an urban setting. Beacons are distributed throughout a city, with each beacon requesting acoustic information. Several mobile phones collect audio information and feed the information back to the beacons. The beacons send this information back to a service provider for processing. Upon detecting a gunshot from the information, relative times of arrivals of the sounds at a central beacon are processed to determine a location of the source of the gunshot.

Extremes and fluctuations in temperature and humidity can cause damage to paintings due to expansion and contraction of the wood and fabric components of the paintings. Wood and fabric absorb moisture, which causes them to swell on humid days and shrink on dry days. Paint, however, is not as resilient and can crack and flake off as a result of expansion and contraction of underlying wood and fabric structure. The proper display and storage of paintings at a museum can be achieved by monitoring the environment in various rooms to identify the best area for display or storage of paintings. Museum visitors with mobile phones pass humidity data to central beacons located in different rooms. The central beacons then transmit the data to a service provider. The museum curator can access the data and determine an optimum location (e.g., room) for a painting.

An ice cream vendor is at a sporting event and wants to know where the hottest part of the stadium is so that he can go there and sell ice cream. Spectators provide temperature data from various parts of the stadium and pass this data along to beacons spaced throughout the stadium. The beacons transmit the data to a service provider, and the service provider generates a heat map of the entire stadium based on current temperatures as detected by mobile phones. The heat map shows the current temperatures using different colors so that the ice cream vendor can identify the hottest spots and sell ice cream there.

Magnetic field sensors can be used as short range metal detectors to find metal or other objects that are affected by a magnetic field. Mobile devices at an airport collect and pass magnetic field information to beacons located throughout the airport. The airport can use this information to detect the presence and location of weapons even before a passenger goes through airport security.

Wait staff at a restaurant are equipped with smart watches that monitor their heart rate and how many steps they have taken. Beacons located throughout the restaurant collect this information from the smart watches. The manager of the restaurant monitors this information to determine the busiest part of the restaurant and if a waiter or waitress needs to be moved to a less busy part of the restaurant.

Patients are provided with smart watches while waiting to see the doctor. A beacon in the waiting room of a hospital or doctor's office captures breathing rate, heart rate, and blood pressure information. A nurse monitors this information to ensure that no patients are in critical condition.

An advertising company wants to determine the effect of ads and movie previews on an audience. As moviegoers are watching the different commercials and previews, their mobile phones collect breathing rate and heart rate information. Beacons located in the theater gather this information, and the advertising company can evaluate how effective certain ads and movie trailers are.

A presenter giving a speech wants to see the effect his speech has on the audience. The mobile devices of the audience collect heart rates, breathing rates, perspiration levels, and various other proxies that can be attributed to customer engagement, and pass this information to beacons. This information can be communicated to the presenter in real time so the presenter can see, in aggregate, if what is being said is engaging the audience.

Figure 3:
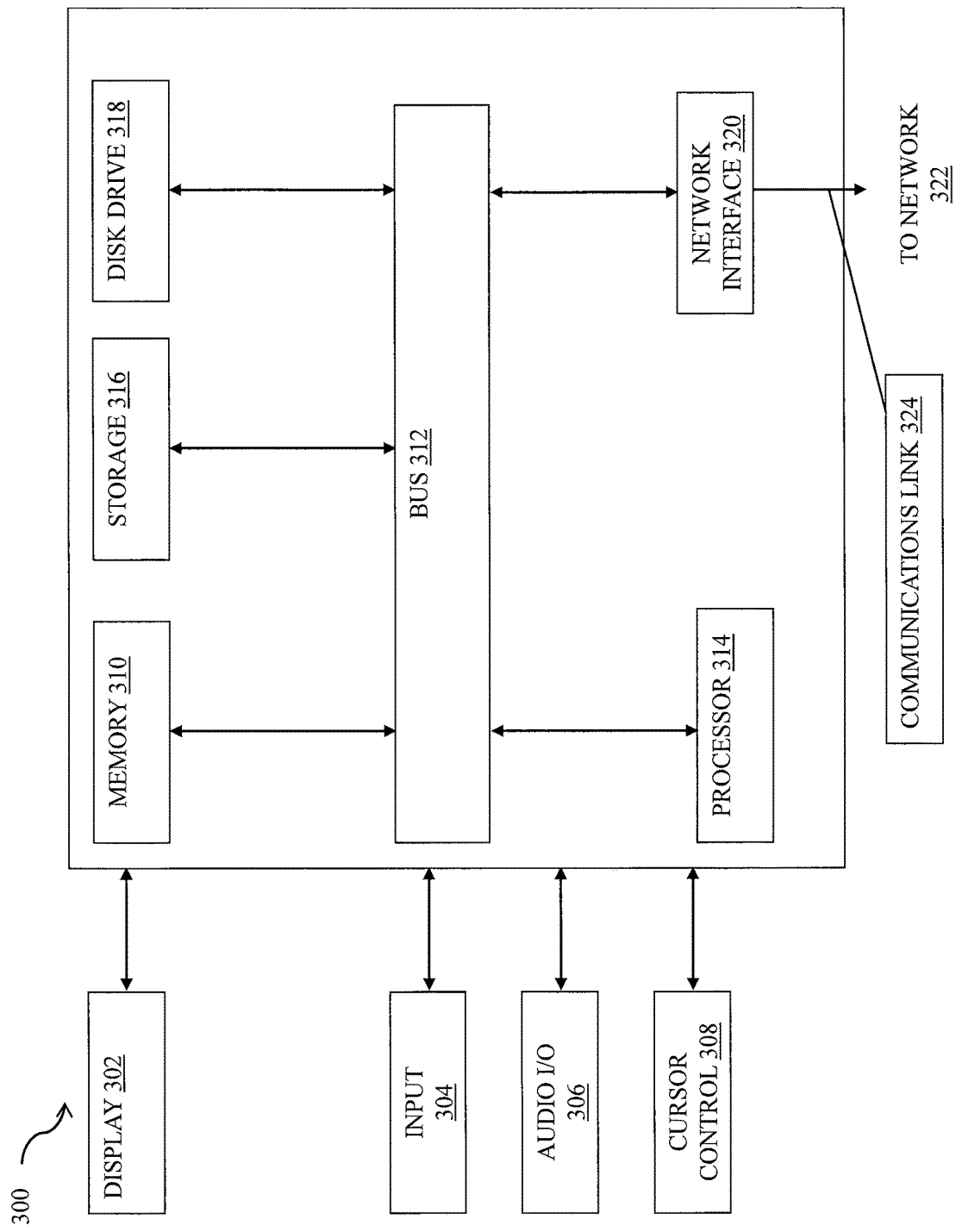
FIG. 3 is a block diagram of a system for implementing a device according to an embodiment of the present disclosure.

FIG. 3 is a block diagram of a computer system 300 suitable for implementing one or more embodiments of the present disclosure, including the user device 120, the beacon 130, beacon 140, mobile device 150, mobile device 160, and the service provider server 180. In various implementations, the user device 120, beacon 130, beacon 140, mobile device 150, and mobile device 160 may comprise a mobile cellular phone, personal computer (PC), laptop, wearable computing device, etc. adapted for wireless communication, and the service provider server 180 may comprise a network computing device, such as a server. Thus, it should be appreciated that the devices 120, 130, 140, 150, 160, and 180 may be implemented as computer system 300 in a manner as follows.

Computer system 300 includes a bus 312 or other communication mechanism for communicating information data, signals, and information between various components of computer system 300. Components include an input/output (I/O) component 304 that processes a user (i.e., sender, recipient, service provider) action, such as selecting keys from a keypad/keyboard, selecting one or more buttons or links, etc., and sends a corresponding signal to bus 312. I/O component 304 may also include an output component, such as a display 302 and a cursor control 308 (such as a keyboard, keypad, mouse, etc.). An optional audio input/output component 306 may also be included to allow a user to use voice for inputting information by converting audio signals. Audio I/O component 306 may allow the user to hear audio. A transceiver or network interface 320 transmits and receives signals between computer system 300 and other devices, such as another user device, a merchant server, or a service provider server via network 322. In one embodiment, the transmission is wireless, although other transmission mediums and methods may also be suitable. A processor 314, which can be a micro-controller, digital signal processor (DSP), or other processing component, processes these various signals, such as for display on computer system 300 or transmission to other devices via a communication link 324. Processor 314 may also control transmission of information, such as cookies or IP addresses, to other devices.

Components of computer system 300 also include a system memory component 310 (e.g., RAM), a static storage component 316 (e.g., ROM), and/or a disk drive 318. Computer system 300 performs specific operations by processor 314 and other components by executing one or more sequences of instructions contained in system memory component 310. Logic may be encoded in a computer readable medium, which may refer to any medium that participates in providing instructions to processor 314 for execution. Such a medium may take many forms, including but not limited to, non-volatile media, volatile media, and transmission media. In various implementations, non-volatile media includes optical or magnetic disks, volatile media includes dynamic memory, such as system memory component 310, and transmission media includes coaxial cables, copper wire, and fiber optics, including wires that comprise bus 312. In one embodiment, the logic is encoded in non-transitory computer readable medium. In one example, transmission media may take the form of acoustic or light waves, such as those generated during radio wave, optical, and infrared data communications.

Some common forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, or any other medium from which a computer is adapted to read.

In various embodiments of the present disclosure, execution of instruction sequences to practice the present disclosure may be performed by computer system 300. In various other embodiments of the present disclosure, a plurality of computer systems 300 coupled by communication link 324 to the network (e.g., such as a LAN, WLAN, PTSN, and/or various other wired or wireless networks, including telecommunications, mobile, and cellular phone networks) may perform instruction sequences to practice the present disclosure in coordination with one another.

Where applicable, various embodiments provided by the present disclosure may be implemented using hardware, software, or combinations of hardware and software. Also, where applicable, the various hardware components and/or software components set forth herein may be combined into composite components comprising software, hardware, and/or both without departing from the spirit of the present disclosure. Where applicable, the various hardware components and/or software components set forth herein may be separated into sub-components comprising software, hardware, or both without departing from the scope of the present disclosure. In addition, where applicable, it is contemplated that software components may be implemented as hardware components and vice-versa.

Software in accordance with the present disclosure, such as program code and/or data, may be stored on one or more computer readable mediums. It is also contemplated that software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein.

The various features and steps described herein may be implemented as systems comprising one or more memories storing various information described herein and one or more processors coupled to the one or more memories and a network, wherein the one or more processors are operable to perform steps as described herein, as non-transitory machine-readable medium comprising a plurality of machine-readable instructions which, when executed by one or more processors, are adapted to cause the one or more processors to perform a method comprising steps described herein, and methods performed by one or more devices, such as a hardware processor, user device, server, and other devices described herein.

What is claimed is:

1. A system, comprising:
   a non-transitory memory; and
   one or more hardware processors coupled to the non-transitory memory and configured to read instructions from the non-transitory memory to cause the system to perform operations comprising:
      generating, using an output device, an audio output within a geographical boundary;
      determining that one or more mobile devices are within the geographical boundary based on location data obtained from the one or more mobile devices;
      determining, for each mobile device of the one or more mobile devices, a corresponding location within the geographical boundary;
      retrieving, from said each mobile device of the one or more mobile devices, corresponding audio data during a time period, wherein the corresponding audio data represents an audio intensity of the audio output detected by said each mobile device of the one or more mobile devices;
      associating the corresponding audio data retrieved from said each mobile device of the one or more mobile devices with the corresponding location corresponding to said each mobile device of the one or more mobile devices;
      creating a real time audio data map based on the corresponding audio data and the corresponding location of said each mobile device of the one or more mobile devices within the geographical boundary, wherein the real time audio data map represents audio intensities obtained from said each mobile device of the one or more mobile devices at different locations within the geographical boundary;
      determining a location of the output device based on the real time audio data map;
      visually indicating the location of the output device within the real time audio data map; and
      modifying, using the output device the audio output based on the real time audio data map.

2. The system of claim 1, wherein the modifying the audio output comprises adjusting, based on analyzing the real time audio data map, one or more auditory characteristics of the audio output.

3. The system of claim 1, wherein the corresponding audio data is first audio data, wherein the time period is a first time period, and wherein the operations further comprise:
   retrieving, from said each mobile device of the one or more mobile devices, corresponding second audio data during a second time period; and
   updating the real time audio map based on the corresponding second audio data.

4. The system of claim 1, wherein the operations further comprise retrieving corresponding image data from said each mobile device of the one or more mobile devices during the time period, and wherein the modifying the audio output is further based on the corresponding image data.

5. The system of claim 1, wherein the corresponding audio data is first audio data, wherein the time period is a first time period, wherein the first audio data is retrieved during the first time period at a first frequency, and wherein the operations further comprise:
   detecting a change of the audio intensities based on analyzing the first audio data; and
   in response to detecting the change of the audio intensities, retrieving, from said each mobile device of the one or more mobile devices, corresponding second audio data during a second time period at a second frequency higher than the first frequency.

6. The system of claim 1, wherein the operations further comprise:
   retrieving, from the one or more mobile devices, biological data of users associated with the one or more mobile devices, and wherein the modifying the audio output is further based on the biological data.

7. The system of claim 1, wherein the operations further comprise retrieving video content captured by the one or more mobile devices during the time period, wherein the modifying the audio signal is further based on the video content.

8. A method, comprising:
   generating, by one or more hardware processors using an output device, an audio signal within a geographical boundary;
   retrieving, by the one or more hardware processors from each mobile device of a plurality of mobile devices located within the geographical boundary, corresponding audio data during a time period, wherein the corresponding audio data represents an audio intensity of the audio signal detected by said each mobile device of the plurality of mobile devices;
   determining, by the one or more hardware processors for said each mobile device of the plurality of mobile devices, a corresponding location within the geographical boundary;
   associating, by the one or more hardware processors, the corresponding audio data retrieved from said each mobile device of the plurality of mobile devices with the corresponding location corresponding to said each mobile device of the plurality of mobile devices;
   creating, by the one or more hardware processors, a real time audio data map based on the corresponding audio data and the corresponding location of said each mobile device of the plurality of mobile devices within the geographical boundary, wherein the real time audio data map represents audio intensities from said each mobile device of the plurality of mobile devices at different locations within the geographical boundary; and determining a location of the output device based on the real time audio data map;

visually indicating the location of the output device within the real time audio data map; and modifying, by the one or more hardware processors using the output device, the audio signal based on the real time audio data map.

9. The method of claim 8, further comprising:

retrieving, from the plurality of mobile devices, video content captured by the plurality of mobile devices, wherein the modifying the audio signal is further based on the video content.

10. The method of claim 8, further comprising:

retrieving, from the plurality of mobile devices, biological data of users associated with the plurality of mobile devices, wherein the modifying the audio signal is further based on the biological data.

11. The method of claim 8, wherein the corresponding audio data is first audio data, wherein the time period is a first time period, and wherein the method further comprises:

retrieving, from said each mobile device of the plurality of mobile devices, second audio data during a second time period; and updating the real time audio data map based on the second audio data.

12. The method of claim 8, wherein the modifying the audio signal comprises adjusting, based on analyzing the real time audio data map, one or more auditory characteristics of the audio signal.

13. The method of claim 8, further comprising:

retrieving, from the plurality of mobile devices, image data captured by the plurality of mobile devices, wherein the modifying the audio signal is further based on the image data.

14. The method of claim 8, wherein the corresponding audio data is first audio data, wherein the time period is a first time period, wherein the first audio data is retrieved during the first time period at a first frequency, and wherein the operations further comprise:

detecting a change of the audio intensities based on analyzing the first audio data; and in response to detecting the change of the audio intensities, retrieving, from said each of the plurality of mobile devices, corresponding second audio data during a second time period at a second frequency higher than the first frequency.

15. A non-transitory machine-readable medium having stored thereon machine-readable instructions executable to cause a machine to perform operations comprising:

generating, using an output device, an audio output within a geographical boundary;

determining that one or more mobile devices are within the geographical boundary based on location data obtained from the one or more mobile devices;

determining, for each mobile device of the one or more mobile devices, a corresponding location within the geographical boundary;

retrieving, from said each mobile device of the one or more mobile devices, corresponding audio data during a time period, wherein the corresponding audio data represents an audio intensity of the audio output detected by said each mobile device of the one or more of mobile devices;

associating the corresponding audio data retrieved from said each mobile device of the one or more mobile devices with the corresponding location corresponding to said each mobile device of the one or more mobile devices;

creating a real time audio data map based on the corresponding audio data and the corresponding location of said each mobile device of the one or more mobile devices within the geographical boundary, wherein the real time audio data map represents audio intensities obtained from said each mobile device of the one or more mobile devices at different locations within the geographical boundary;

determining a location of the output device based on the real time audio data map;

visually indicating the location of the output device within the real time audio data map; and modifying, using the output device, the audio output based on the real time audio data map.

16. The non-transitory machine-readable medium of claim 15, wherein the modifying the audio output comprises adjusting, based on analyzing the real time audio data map, one or more auditory characteristics of the audio output.

17. The non-transitory machine-readable medium of claim 15, wherein the operations further comprise retrieving, from the one or more mobile devices, video content captured by the one or more mobile devices during the time period, and wherein the modifying the audio output is further based on the video content.

18. The non-transitory machine-readable medium of claim 15, wherein the corresponding audio data is first audio data, wherein the time period is a first time period, wherein the first audio data is retrieved during the first time period at a first frequency, and wherein the operations further comprise:

detecting a change of the audio intensities based on analyzing the first audio data; and in response to detecting the change of the audio intensities, retrieving, from said each mobile device of the one or more mobile device, second audio data during a second time period at a second frequency higher than the first frequency.

19. The non-transitory machine-readable medium of claim 15, wherein the operations further comprise retrieving, from the one or more mobile devices, image data captured by the one or more mobile devices during the time period, and wherein the modifying the audio output is further based on the image data.

20. The non-transitory machine-readable medium of claim 15, wherein the operations further comprise retrieving, from the one or more mobile devices, biological data associated with users of the one or more mobile devices during the time period, and wherein the modifying the audio output is further based on the biological data.

* * * * *